US009150705B2

(12) United States Patent
Hage et al.

(10) Patent No.: US 9,150,705 B2
(45) Date of Patent: Oct. 6, 2015

(54) CURING LIQUIDS

(75) Inventors: Ronald Hage, Leiden (NL); Richard Allen Reichert, Jr., Akron, OH (US)

(73) Assignee: OMG ADDITIVES LIMITED, London (GB)

( * ) Notice: Subject to any disclaimer, the term of this patent is extended or adjusted under 35 U.S.C. 154(b) by 510 days.

(21) Appl. No.: 13/520,408

(22) PCT Filed: Jan. 6, 2011

(86) PCT No.: PCT/GB2011/000007
§ 371 (c)(1),
(2), (4) Date: Jul. 3, 2012

(87) PCT Pub. No.: WO2011/083309
PCT Pub. Date: Jul. 14, 2011

(65) Prior Publication Data
US 2013/0123452 A1     May 16, 2013

(30) Foreign Application Priority Data
Jan. 6, 2010   (EP) .................................... 10150166

(51) Int. Cl.
*C08K 5/00* (2006.01)
*C08K 5/34* (2006.01)

(52) U.S. Cl.
CPC ............. *C08K 5/0091* (2013.01); *C08K 5/0025* (2013.01); *C08K 5/34* (2013.01)

(58) Field of Classification Search
USPC ................. 252/186.39, 186.4, 186.1, 186.25, 252/186.33; 510/311, 376, 494, 500; 526/281, 280, 330; 525/447; 502/167, 502/165
See application file for complete search history.

(56) References Cited

U.S. PATENT DOCUMENTS

| 4,985,340 | A | 1/1991 | Palazzotto et al. |
| 8,318,836 | B2 * | 11/2012 | Hage et al. ....................... 524/99 |
| 2002/0091214 | A1 | 7/2002 | Waanders et al. |
| 2002/0099156 | A1 | 7/2002 | Baxter et al. |
| 2003/0232732 | A1 * | 12/2003 | Hage et al. ..................... 510/302 |
| 2013/0211013 | A1 * | 8/2013 | Koers et al. .................... 525/447 |

FOREIGN PATENT DOCUMENTS

| EP | 0458397 A2 | 5/1991 |
| EP | 0909809 A2 | 4/1999 |
| EP | 1259522 B1 | 9/2003 |
| EP | 0458397 | * 5/2014 |
| GB | 2386615 A | 9/2003 |
| WO | 9534628 A1 | 12/1995 |
| WO | 9748787 A1 | 12/1997 |
| WO | 9839098 A1 | 9/1998 |
| WO | 0060045 A1 | 10/2000 |
| WO | WO00/60045 | * 10/2000 |
| WO | 0248301 A1 | 6/2002 |
| WO | 02077145 A1 | 10/2002 |
| WO | 0292611 A1 | 11/2002 |
| WO | 03104379 A1 | 12/2003 |
| WO | 2005042532 A1 | 5/2005 |
| WO | 2005047379 A1 | 5/2005 |
| WO | 2006034981 A1 | 4/2006 |
| WO | 2006125517 A1 | 11/2006 |
| WO | 2008003492 A1 | 1/2008 |
| WO | 2008003493 A1 | 1/2008 |
| WO | 2008003495 A1 | 1/2008 |
| WO | 2008003496 A1 | 1/2008 |
| WO | 2008003652 A1 | 1/2008 |

OTHER PUBLICATIONS

European Patent Office International Searching Authority, PCT/GB2011/000007 Search Report and Written Opinion, 8 pages (Feb. 14, 2011).
European Patent Office, EP 10 15 0166 Search Report, 5 pages (Jul. 21, 2010).
Hubin et al., New Iron(II) and Manganese(II) Complexes of Two Ultra-Rigid, Cross-Bridged Tetraazamacrocycles for Catalysis and Biomimicry, J. Am. Chem. Soc., 122, 2512-2522 (2000).
Koek et al., Improved syntheses, structures, spectral and electrochemical properties of [MnIII2(μ-O)(μ-O2CMe)2L2]2+ and [MnIV2(μ-O)3L2]2+ complexes, J. Chem. Soc., Dalton Trans., 353-362 (1996).
Bernal et al., Iron(II) Complexes of Polydentate Aminopyridyl Ligands and an Exchangeable Sixth Ligand; Reactions with Peroxides, J. Am. Chem. Soc., Dalton Trans., 3667-3675 (1995).

* cited by examiner

*Primary Examiner* — Monique Peets
(74) *Attorney, Agent, or Firm* — Hahn Loeser & Parks LLP

(57) ABSTRACT

The present invention relates to accelerators for curing unsaturated polyester resins, vinyl ester resins, and acrylic resins in conjunction with peroxide type initiators. The accelerators are based on iron/manganese complexes of a tridentate, tetradentate, pentadentate, or hexadentate nitrogen donor ligands. Also disclosed are curable resin compositions including the forgoing accelerators and a curing process for employing these accelerators. These resin compositions show good curing properties and do not contain cobalt accelerators. The present invention further relates to gel coats and molded composites prepared from such unsaturated polyester, vinyl ester, and acrylic resins.

23 Claims, No Drawings

CURING LIQUIDS

CROSS-REFERENCE TO RELATED APPLICATIONS

This application is a national stage of PCT International application no. PCT/GB2011/000007 filed Jan. 6, 2011, which claims priority to European application Serial No. 10150166.6 filed Jan. 6, 2010, herein incorporated by reference.

FIELD

The present invention concerns the curing and hardening of liquids. In particular, present invention relates to accelerators for curing unsaturated polyester resins, vinyl ester resins, and acrylic resins in conjunction with peroxide type initiators. The accelerators are based on iron/manganese complexes of a tridentate, tetradentate, pentadentate, or hexadentate nitrogen donor ligands. Also disclosed are curable resin compositions including the forgoing accelerators and a curing process for employing these accelerators. These resin compositions show good curing properties and do not contain cobalt accelerators. The present invention further relates to gel coats and molded composites prepared from such unsaturated polyester, vinyl ester, and acrylic resins.

BACKGROUND

Thermoset resins, including unsaturated polyesters and vinyl esters, are commonly employed in a variety of fabrications, such as casting materials, fiber reinforced materials, and coatings. These resins are typically dissolved in an unsaturated vinyl monomer, like styrene, to facilitate crosslinking (curing) and reduce viscosity. The resin is cured with a peroxide type initiator by means of a free radical co-polymerization mechanism to form a solid article. Accelerators are used to promote the decomposition of peroxides.

WO2008003496 discloses a resin composition comprising an unsaturated polyester resin or vinyl ester resin, a manganese compound and a thiol-containing compound and a peroxide compound having formula ROOH, in which R is hydrogen or an optionally substituted alkyl group.

WO2008003495 discloses an unsaturated polyester resin composition comprising an unsaturated polyester resin, a manganese compound, a 1,3-dioxo compound and a base; the resin composition being curable with a peroxide.

SUMMARY

We have found active iron and manganese compounds are active as primary accelerators at relatively low concentrations for curing unsaturated resins (resin) in the presence of a peroxide. This permits reduction or negation of toxic cobalt accelerators. The curing composition also exhibit less colour perturbation and are less dependent upon temperature to facilitate curing.

The inventions is particularly applicable to curing mediums that require reduced amounts of cobalt accelerants whist functioning effectively and indeed the present invention permits the negation of a cobalt accelerant.

In a first aspect the present invention provides a liquid curable medium comprising:
(i) from 5 to 95 wt % of an unsaturated resin;
(ii) from 0.001 to 10 wt % of a peroxide;
(iii) from 0.00001 and 0.02% wt % based on metal of a primary accelerator, wherein the primary accelerator is an iron or manganese complex of a tridentate, tetradentate, pentadentate or hexadentate nitrogen donor ligand, wherein the ligand is selected from the group consisting of:

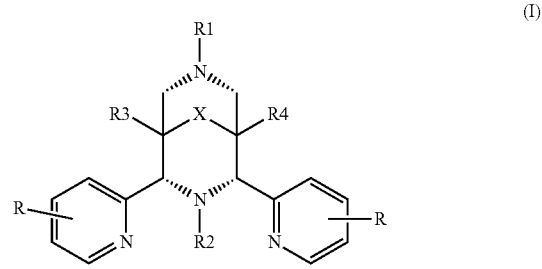

wherein each R is independently selected from: hydrogen, F, Cl, Br, hydroxyl, C1-C4-alkylO—, —NH—CO—H, —NH—CO—C1-C4-alkyl, —NH2, —NH—C1-C4-alkyl, and C1-C4-alkyl;
R1 and R2 are independently selected from:
C1-C24-alkyl, C6-C10-aryl, and,
a group containing a heteroatom capable of coordinating to a transition metal;
R3 and R4 are independently selected from hydrogen, C1-C8 alkyl, C1-C8-alkyl-O—C1-C8-alkyl, C1-C8-alkyl-O—C6-C10-aryl, C6-C10-aryl, C1-C8-hydroxyalkyl, and —(CH2)$_n$C(O)OR5
wherein R5 is independently selected from: hydrogen, C1-C4-alkyl, n is from 0 to 4, and mixtures thereof; and,
X is selected from C=O, —[C(R6)$_2$]$_y$— wherein y is from 0 to 3 each R6 is independently selected from hydrogen, hydroxyl, C1-C4-alkoxy and C1-C4-alkyl;

wherein each $R^1$, $R^2$ independently represents —$R^4$-$R^5$,
$R^3$ represents hydrogen, optionally substituted alkyl, aryl or arylalkyl, or —$R^4$-$R^5$,
each $R^4$ independently represents a single bond or optionally substituted alkylene, alkenylene, oxyalkylene, aminoalkylene, alkylene ether, carboxylic ester or carboxylic amide, and
each $R^5$ independently represents an optionally N-substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl and thiazolyl;

wherein each R20 is selected from: an alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R21)_3$, wherein R21 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—R22, in which Y is independently selected from H, CH3, C2H5, C3H7 and R22 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least one of R20 is a —$CY_2$—R22;

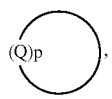
(IV)

wherein: Q is independently selected from:

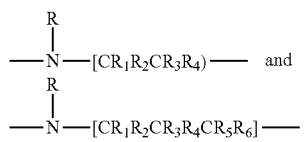

p is 4;
R is independently selected from: hydrogen, C1-C6-alkyl, CH2CH2OH, pyridin-2-ylmethyl, and CH2COOH;
R1, R2, R3, R4, R5 and R6 are independently selected from: H, C1-C4 alkyl, and C1-C4-alkylhydroxy;

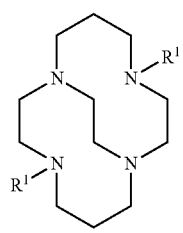
(V)

wherein "$R^1$" is independently selected from H, and linear or branched, substituted or unsubstituted C1 to C20 alkyl, alkylaryl, alkenyl or alkynyl; and all nitrogen atoms in the macropolycyclic rings are coordinated with the transition metal;

R17R17N—X—NR17R17 (VI), wherein:
X is selected from —$CH_2CH_2$—, —$CH_2CH_2CH_2$—, —$CH_2C(OH)HCH_2$—; and,
R17 independently represents a group selected from: R17 and alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R19)_3$, wherein R19 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—R18, in which Y is independently selected from H, CH3, C2H5, C3H7 and R18 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl;
and wherein at least two of R17 are —$CY_2$—R18; and

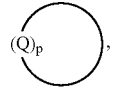
(VII)

wherein: Q=

—N(R)—[CR₁R₂CR₃R₄]—;

p is 3;
each R is independently selected from: hydrogen, C1-C6-alkyl, $CH_2CH_2OH$,
$CH_2COOH$, and pyridin-2-ylmethyl or one R is an ethylene bridge to a >NR nitrogen atom of a Q of a second ligand of formula (VII);
R1, R2, R3, and R4 are independently selected from: H, C1-C4-alkyl, and C1-C4-alkylhydroxy.

According to particular embodiments of the first aspect of the invention, the primary accelerator is a complex of a tetradentate, pentadentate or hexadentate nitrogen donor ligand, wherein the ligand is selected from the group consisting of ligands of formulae (I) to (VI).

According to other embodiments of the first aspect of the invention, the primary accelerator is a complex of a tridentate, tetradentate, pentadentate or hexadentate nitrogen donor ligand, wherein the ligand is selected from the group consisting of ligands of formulae (I) to (VII) in which the primary accelerator is a manganese complex where the ligand is of formula (VII).

In another aspect the present invention provides a method of providing the liquid curable medium by the admixture of the primary accelerator, the resin, and the peroxide. The primary accelerator is most preferably added as a solution in a polar solvent.

In a further aspect the present invention provides the cured liquid medium, i.e. a liquid curable medium according to the first aspect of the invention, including the particular embodiments thereof defined herein, wherein the liquid curable medium is cured. Thus, there is provided according to this aspect a cured resin obtainable by curing a liquid curable medium according to the first aspect of the invention.

Preferably the liquid curable medium comprises less than 0.01 wt % of cobalt wt % based on metal, more preferably less than 0.005, most preferably less than 0.0001 wt %. Ideally the liquid curable medium does not contain cobalt, i.e., the liquid curable medium is cobalt free.

DETAILED DESCRIPTION

The Resin
The liquid curable medium comprises from from about 5 to about 95 wt % of an unsaturated resin. In some embodiments, the liquid curable medium comprises from from about 10 to about 95 wt % of the unsaturated resin.

The unsaturated polyester resin or vinyl ester resin as is comprised in the resin may be suitable selected from the unsaturated polyester resin or vinyl ester resin as are well known in the art. The resin comprises a reactive diluent that serves to cross link. Examples of unsaturated polyester resin or vinyl ester resins to be used in resin compositions of the present invention are subdivided in different categories as listed below.

(1) Ortho resins: these are based on phthalic anhydride, maleic anhydride, or fumaric acid and glycols, such as ethylene glycol, diethylene glycol, triethylene glycol, 1,2-propylene glycol, 1,3-propylene glycol, dipropylene glycol, tripopylene glycol, neopentyl glycol, or hydrogenated bis-phenol A. Commonly the ones derived from 1,2-propylene glycol are used in combination with a reactive diluent such as styrene.

(2) Iso-resins: these are usually prepared from isophthalic acid, maleic anhydride or fumaric acid, and the glycols. These resins may typically contain a higher level of reactive diluent than the ortho-resins.

(3) Bisphenol-A-fumarates: these are based on ethoxylated bisphenol-A and fumaric acid.

(4) Chlorendics: are resins prepared from chlorine/bromine containing anhydrides or phenols in the preparation of UP resins.

(5) Vinyl ester resins: these are resins which are mostly used because of their hydrolytic resistance and excellent mechanical properties, are having unsaturated sites only in the terminal position, introduced by reactions of epoxy resins with (meth)acrylic acid. Typical types of epoxy resins include bisphenol-A, novalac, tetraphenyloethane, cycloaliphatic, tetrabromobisphenol-A, etc.

Similar to iso resins and ortho resins are unsaturated polyester resins containing terephthalic acid. Besides these classes of resins also so-called dicyclopentadiene (DCPD) resins can be distinguished as unsaturated polyester resin.

As used herein, a vinyl ester resin is a (meth)acrylate functional resin. Also the class of vinyl ester urethane resins (also referred to urethane methacyclate resins) can be distinguished a vinyl ester resins. Preferably, the vinyl ester resin used in the present invention is a resin that is obtained by the esterification of an epoxy resin with a (meth)acrylic acid or a (meth)acrylamide.

All of these resins, as can suitably used in the context of the present invention, may be modified according to methods known in the art, e.g. for achieving lower acid number, hydroxyl number or anhydride number, or for becoming more flexible due to insertion of flexible units in the backbone, etc.

Also other reactive groups curable by reaction with peroxides may be present in the resins, for instance reactive groups derived from itaconic acid, citraconic acid and allylic groups, etc. Accordingly the unsaturated polyester resins or vinyl ester resins used in the present invention may contain solvents. The solvents may be inert to the resin system or they may be reactive therewith during the curing step. Reactive solvents are particularly preferred. Examples of suitable reactive solvents are styrene, vinyl toluene, divinyl benzene, methyl methacrylate, diallyl phthalate, α-methyl styrene, triallyl cyanurate, (meth)acrylates, N-vinylpyrrolidone, and N-vinylcaprolactam. Mixtures of the reactive solvents, especially with styrene, are also employed. The amount of styrene and/or other reactive diluent may be as large as 60% of the resin composition, but is typically between 25% and 35%.

The unsaturated polyester resins and vinyl ester resins as are being used in the context of the present invention may be any type of such resins, but preferably are chosen from the group of DCPD resins, iso-phthalic resins and ortho-phthalic resins and vinyl ester resins or blends thereof.

The resin composition according to the invention preferably has an acid value in the range of from 0.001-300 mg KOH/g of resin composition. As used herein, the acid value of the resin composition is determined titrimetrically according to ISO 2114-2000. Preferably the molecular weight of the unsaturated polyester resin is in the range of from 500 to 200.000 g/mol. As used herein the molecular weight of the resin is determined using gel permeation chromatography according to ISO 13885-1. The resin compositions according to the present invention generally contain less than 5 wt % of water.

Acrylic resin as is comprised in the resin compositions according to the present invention, may be suitable selected from thermoset acrylic resin or acrylic modified resin as are well known in the art. Examples of acrylic resin or modified acrylic resins to be used in resin compositions of the present invention are listed below.

Acrylic resins: based on acrylic monomers that typically contain either acrylate functionality or methacrylate functionality of the general structures:

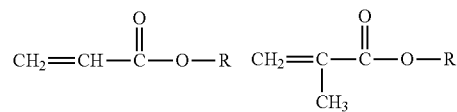

where R can be aromatic or aliphatic, and also contain linear, branched, or cyclic alkanes, ethers, or esters. Acrylic monomers, a.k.a. acrylic ester and methacrylic ester monomers, are typically synthesized from acrylic acid or methacrylic acid and alcohols. In addition to the standard sidechains, special functionality can be added to (meth)acrylic ester monomers by the use of the appropriate functional alcohol. Examples include glycidyl methacrylate, t-butylaminoethyl methacrylate, dimethylaminoethyl methacrylate, 2-hydroxyethyl acrylate, 2-hydroxyethyl methacrylate, N-hydroxymethy acrylamide, N-hydroxymethyl methacrylamide, etc., as well as, hydroxy (meth)acrylates made from glycidyl esters of carboxylic acids.

Also included with functional monomers are carboxyl types like methacrylic acid, acrylic acid, and itiaconic acid, as well as, multifunctional types like 1,4-butylene dimethacrylate, ethyleneglycol dimethacrylate, 1,6 hexandiol dimethacrylate, diethyleneglycol dimethacrylate, bisphenol-A dimethacrylate, ethoxylated bisphenol-A dimethacrylate, trimethylol propane triacrylate, trimethylol propane methacrylate, ethoxylated trimethylolpropane trimethacrylate etc.

Acrylic resins can also use oligomeric acrylates, which are acrylated urethanes, epoxies, polyesters, polyethers, and acrylics. The oligomeric acrylates are formed by reacting acrylate functional monomers with primary or secondary functional groups on the oligomer. The acrylate functional monomers can be added directly to the oligomer or attached to the oligomer using a secondary difunctional monomer. For instance, ureathane acrylate oligomers are formed by reacting polyester or polyether polyol oligomers with diisocyanates (aliphatic or aromatic) and hydroxy (meth)acrylates. Epoxy acrylate oligomers are formed by reacting epoxy resins with carboxyl functional (meth)acrylates. Polyether oligomers can also be reacted with carboxy functional (meth)acrylates to form polyethylene glycol dimethacrylate, as an example.

Additionally, acrylic resins can use pre-reacted polymer-in-monomer syrups made by polymerizing an acrylic monomer or co-polymerizing a mixture of different acrylic monomers to a specific degree of polymerization, typically 10-60%. The polymerization is typically carried out at 50-110° C. using a small amount of polymerization initiator and an optional chain transfer agent. The reaction proceeds to a predetermined viscosity, approximation of polymerization degree, and is then cooled to room temperature. Optionally, the reaction is quench cooled by the addition of cold monomer containing a polymerization inhibitor.

Acrylic modified resins are broad category of resins that are similar to oligomeric acrylates, with the exception that acrylic modified resins use a base resin of sufficient molecular weight as not to be considered an oligomer. Examples of base resins include polyols, unsaturated polyols, polyesters, unsaturated polyesters, unsaturated dicyclopentadiene-based polyesters, polyisocyantes (chain extended and/or multifunctional), epoxies (Bisphenol-A, novalac, and chain extended) and polyacids, which are typically the products of polyols and polycarboxylic acids or anhydrides. Acrylic modified resins are formed by reacting a base resin's primary and secondary functional groups directly with functional acrylic monomers to create primary and/or secondary (meth)acrylic double bonds on the base resin. Base resin modification with (meth) acrylic double bonds may also be achieved indirectly by initially reacting the resin's primary and/or secondary functional groups with other difunctional or polyfunctional compounds such as isocyanates, acids, or anhydrides. Additionally, Acrylic resins may be further modified by reacting secondary functional groups formed during the initial modification. Methods for the preparation of acrylic modified resins are well known to those skilled in the art.

Accordingly acrylic modified resins used in the present invention may contain solvents. The solvents may be inert to the resin system or they may be reactive therewith during the curing step. Reactive solvents are particularly preferred. Acrylic monomers and/or oligomeric acrylates, discussed above, are examples of suitable reactive solvent typically used with acrylic modified resins. Alternately, acrylic monomers can be copolymerized with styrene, vinyl toluene, divinyl benzene, acrylonitrile, vinyl acetate, and vinyl esters of carboxylic acids, etc. in both acrylic and acrylic modified resin.

The use of acrylic monomers and/or oligomeric acrylates as reactive diluents for curing or crosslinking further extends the definition of modified acrylic resins to include resins modified by allylic functional groups, where the allylic functionality is introduced to the base resin by allyl glycidyl ether, trimethylol propanediallyl ether, allyl pentaerythritol, and related derivatives.

The unsaturated polyester, vinyl ester, and acrylic resin systems described above are cured using peroxide type and azo-type initiators. Initiators are typically dissociated using heat, UV light, or at room temperature with accelerators to form the free radicals required to begin polymerization. Accelerators are usually employed with peroxides, but their use is not limited to ambient curing applications. Not all peroxide initiators can be activated by every accelerator and not all peroxide/accelerator systems are active enough for every resin system. The current state of the art for ambient curing of unsaturated polyester and vinyl ester resins uses peroxides accelerated by the presence of metal compounds, especially cobalt salts as accelerators. Cobalt naphthenate and cobalt octanoate are the most widely used accelerators. The peroxides most commonly used in conjunction with cobalt accelerators are ketone peroxides, hydroperoxides and peresters, specifically with methylethylketone peroxide (MEKP) as the most common type. Modified acrylic resins that contain a significant amount of styrene mixed with acrylate monomers can also be cured with MEKP/cobalt system. The ability to activate many different initiators and be compatible with many resin systems accounts for wide use of cobalt accelerators.

However, cobalt accelerators have become undesirable because of their health and environmental hazards. Cobalt accelerators also suffer other technical detriments that include poor reactivity at low temperature (<15° C.), color imparted to the resin, and poor reactivity with acrylic and methacrylic monomers, especially in acrylic resins. Many molding applications take place at ambient temperature. However in winter months, ambient temperature may be significantly lower than 15-40° C., which is the typical operating temperature for ambient curing with cobalt accelerators. At temperatures below 15° C., the reduction in activity of cobalt accelerators is disproportionate to the reduction in temperature rendering them ineffective. Also, cobalt octoate and naphthenate salts are very dark in color. When used as a primary accelerator at a typical concentration of about 0.02% (based on metal), the color form the cobalt accelerator affects the color of the cure gel coat or molded composite. Lower cobalt accelerator levels can be used, but with longer gel and peak exotherm times and lower peak exotherm temperatures. Lastly, unsaturated polyester and vinyl ester resins have been incorporating low volatile acrylic and methacrylic monomers as one way to meet recent government regulations to restrict styrene emissions in open molding facilities. However, the amount of styrene substitution is limited by the poor co-polymerization of most acrylates and methacrylates with maleate and fumarate moieties in the polyester backbone, as well as, the ability of cobalt accelerated MEKP systems to effectively form radicals with acrylic monomers. The latter is especially apparent in acrylic resin systems where cobalt accelerated MEKP systems exhibit little or no reactivity in the absence of styrene. The most common initiator/accelerator system currently practiced with acrylic resin systems is benzoyl peroxide (BPO) with at tertiary amine accelerator; i.e. dimethyl aniline (DMA). However, the BPO is less than ideal because it is a solid powder and the DMA can produce a highly colored gel coat of molded composite. The cured BPO/DMA system also suffers strong discoloration by heat and light.

Accordingly, there is substantial need in the unsaturated polyester resin business, and in particular in the field of production of cure gel coats and molded composites as previously defined, for the finding of accelerated or promoted unsaturated polyester resin, vinyl ester resin, and acrylic resin compositions showing good curing properties and having no cobalt content. In particular, there is a need for providing accelerated resin compositions that are curable with liquid peroxides. In particular such curing should take place at ambient temperature and preferably, also at sub-ambient temperatures. Preferably, the accelerator resin compound will produce cured gel coats and molded composites low in color.

It was now found, surprisingly, that unsaturated polyester resin, vinyl ester resin, and acrylic resin systems with efficient curing performance when cured with a peroxide could be obtained by using a resin composition comprising an unsaturated polyester resin, vinyl ester resin, or acrylic resin and an accelerator comprising a manganese or iron complex of a tridentate, tetradentate, pentadentate or hexadentate nitrogen donor ligand, e.g. a tetradentate, pentadentate or hexadentate nitrogen donor ligand, as defined below. These iron and manganese complexes function as cobalt-free primary accelerators at low concentrations with surprising technical benefits of reduced color, activity at ambient and sub-ambient temperature, and good curing reactivity in acrylic resins compared to state of the art cobalt accelerators.

Primary Accelerator

Preferably, the accelerator is present in the resin composition from 0.00001 and 0.02% w/w based on metal, more preferably from 0.00005 and 0.005% w/w based on metal.

The level of the primary accelerator may be made up from a mixture of the primary accelerators.

The tridentate, tetradentate, pentadentate or hexadentate nitrogen donor ligand, e.g. a tetradentate, pentadentate or hexadentate nitrogen donor ligand, may be built up within any organic structure which will support coordinating nitrogen atoms. For example one can take a basic tridentate ligand such as 1,4,7-triazacyclononane and have further nitrogen co-ordination groups, e.g., —CH2-CH2-NH2, —CH2-Py, covalently bound to one or more of the cyclic nitrogens or aliphatic groups.

Preferably the iron ion is selected from Fe(II) and Fe(III) and the manganese ion is selected from Mn(II), Mn(III), and Mn(IV).

Preferably the ligand is present in one or more of the forms [MnLCl$_2$]; [FeLCl$_2$]; [FeLCl]Cl; [FeL(H$_2$O)](PF$_6$)$_2$; [FeL]Cl$_2$, [FeLCl]PF$_6$ and [FeL(H$_2$O)](BF$_4$)$_2$.

The following are preferred classes of primary accelerator that are iron or manganese complexes of tetradentate, pentadentate or hexadentate nitrogen donor ligands.

If unspecified the length of any alkyl chain is preferably C1 to C8-alkyl chain and preferably linear. If unspecified the aryl group is a phenyl group.

Bispidon

The bispidon class are preferably in the form of an iron transition metal catalyst.

The bispidon ligand is preferably of the form:

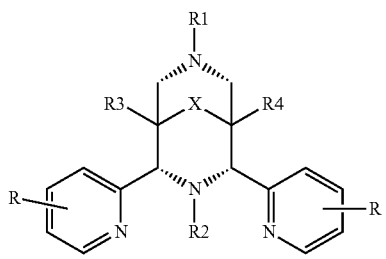

(I)

wherein each R is independently selected from: hydrogen, F, Cl, Br, hydroxyl, C1-C4-alkylO—, —NH—CO—H, —NH—CO—C1-C4-alkyl, —NH2, —NH—C1-C4-alkyl, and C1-C4-alkyl;

R1 and R2 are independently selected from:
C1-C24-alkyl,
C6-C10-aryl, and,
a group containing a heteroatom capable of coordinating to a transition metal;

R3 and R4 are independently selected from hydrogen, C1-C8 alkyl, C1-C8-alkyl-O—C1-C8-alkyl, C1-C8-alkyl-O—C6-C10-aryl, C6-C10-aryl, C1-C8-hydroxyalkyl, and —(CH2)$_n$C(O)OR5 wherein R5 is independently selected from: hydrogen, C1-C4-alkyl, n is from 0 to 4, and mixtures thereof; and, X is selected from C=O, —[C(R6)$_2$]$_y$— wherein y is from 0 to 3 each R6 is independently selected from hydrogen, hydroxyl, C1-C4-alkoxy and C1-C4-alkyl.

Preferably R3=R4 and selected from —C(O)—O—CH3, —C(O)—O—CH2CH3, —C(O)—O—CH2C6H5 and CH2OH.

Preferably the heteroatom capable of coordinating to a transition metal is pyridin-2-ylmethyl optionally substituted by —C0-C4-alkyl, e.g. the heteroatom donor group is unsubstituted pyridyl.

Another preferred heteroatom capable of coordinating to a transition metal is a tertiary amine of the form —C2-C4-alkyl-NR7R8, the —C2-C4-alkyl- of the —C2-C4-alkyl-NR7R8 may be substituted by 1 to 4 C1-C2-alkyl, or may form part of a C3 to C6 saturated alkyl ring, R7 and R8 are independently selected from the group consisting of straight chain-C1-C12-alkyl, branched-C1-C12-alkyl or cyclo-C1-C12-alkyl, —CH2C6H5, and in which R7 and R8 may together form a cyclic ring selected from the group:

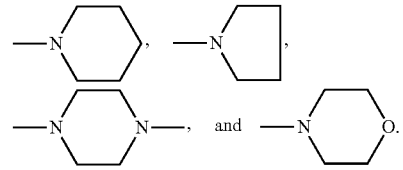

The following are preferred tertiary amines: —CH2CH2-NR7R8, —CH2CMe2-NR7R8, —CMe2CH2-NR7R8, —CMeHCH2-NR7R8, —CMeHCMeH—NR7R8, —CH2CMeH—NR7R8, —CH2CH2CH2-NR7R8, —CH2CH2CMe2-NR7R8, —CH2CMe2CH2-NR7R8, cis

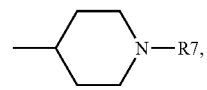

trans

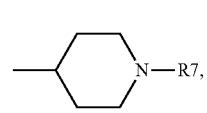

cis

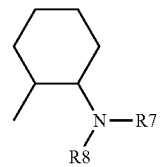

and, trans

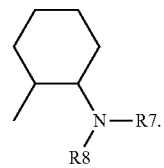

Preferably X is C=O or C(OH)2.
Preferred groups for R1 and R2 are CH3, —C2H5, —C3H7, benzyl, —C4H9, —C6H13, —C8H17, —C12H25, and —C18H37 and pyridin-2-yl. A preferred class of bispidon is one in which at least one of R1 or R2 is pyridin-2-ylmethyl or benzyl, preferably pyridin-2-ylmethyl.

A preferred bispidon is dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1) and the iron complex thereof FeN2py3o-C1 which was prepared as described in WO02/48301. Other preferred bispidons are one in which instead of having a methyl group (C1) at the 3 position have longer alkyl chains, namely isobutyl, (n-hexyl) C6, (n-octyl) C8, (n-dodecyl) C12, (n-tetradecyl) C14, (n-octadecyl) C18, which were prepared in an analogous manner.

Preferred tetradentate bispidons are also illustrated in WO00/60045 and preferred pentadentate bispidons are illustrated in WO02/48301 and WO03/104379.

N4py Type

The N4py are preferably in the form of an iron transition metal catalyst.

The N4py type ligands are preferably of the form:

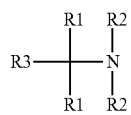

(II)

wherein each $R^1$, $R^2$ independently represents —$R^4$-$R^5$, $R^3$ represents hydrogen, optionally substituted alkyl, aryl or arylalkyl, or —$R^4$-$R^5$, each $R^4$ independently represents a single bond or optionally substituted alkylene, alkenylene, oxyalkylene, aminoalkylene, alkylene ether, carboxylic ester or carboxylic amide, and each $R^5$ independently represents an optionally N-substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl and thiazolyl.

Preferably $R^1$ represents pyridin-2-yl or $R^2$ represents pyridin-2-yl-methyl.

Preferably $R^2$ or $R^1$ represents 2-amino-ethyl, 2-(N-(m)ethyl)amino-ethyl or 2-(N,N-di(m)ethyl)amino-ethyl. If substituted, $R^5$ preferably represents 3-methyl pyridin-2-yl. $R^3$ preferably represents hydrogen, benzyl or methyl.

The preferred ligands are N4Py (i.e. N,N-bis(pyridin-2-ylmethyl)-bis(pyridin-2-yl)methylamine) which is disclosed in WO95/34628 and MeN4py (i.e. N,N-bis(pyridin-2-yl-methyl-1,1-bis(pyridin-2-yl)-1-aminoethane, as disclosed in EP0909809.

TACN-Nx

The TACN-Nx are preferably in the form of an iron transition metal catalyst.

The ligands possess the basic 1,4,7-triazacyclononane structure but have one or more pendent nitrogen groups that complex with the transition metal to provide a tetradentate, pentadentate or hexadentate ligand. Preferably, the basic 1,4,7-triazacyclononane structure has two pendent nitrogen groups that complex with the transition metal (TACN-N2).

The TACN-Nx is preferably of the form:

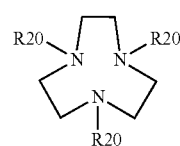

(III)

wherein each R20 is selected from: an alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R21)_3$, wherein R21 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—R22, in which Y is independently selected from H, CH3, C2H5, C3H7 and R22 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least one of R20 is a —$CY_2$—R22.

Preferably R22 is selected from optionally substituted pyridin-2-yl, imidazol-4-yl, pyrazol-1-yl, quinolin-2-yl groups. Most preferably R22 is either a pyridin-2-yl or a quinolin-2-yl.

Me$_3$-TACN and Related Compounds

Another transition metal catalyst for the method is as described in EP 0458397 A and WO06/125517; both of these publications disclose the use of 1,4,7-trimethyl-1,4,7-triazacyclononane (Me$_3$-TACN) and related compounds in metal complexes, e.g. manganese complexes. The PF$_6^-$ ligand of Me$_3$-TACN has been commercialised in laundry detergent powders and dish wash tablets. Alternatively, manganese complexes can contain counterions such as chloride, acetate, sulphate, and nitrate to render them highly water-soluble.

The catalyst is most preferably a mononuclear or dinuclear complex of a Mn II-V transition metal catalyst, the ligand of the transition metal catalyst of formula (VII):

(VII)

wherein: Q=

p is 3;

each R is independently selected from: hydrogen, C1-C6-alkyl, CH$_2$CH$_2$OH, CH$_2$COOH, and pyridin-2-ylmethyl or one R is an ethylene bridge to a >NR nitrogen atom of a Q of a second ligand of formula (VII); and R1, R2, R3, and R4 are independently selected from: H, C1-C4-alkyl, and C1-C4-alkylhydroxy.

R is preferably independently selected from: hydrogen, CH3, C2H5, CH2CH2OH and CH2COOH. R, R1, R2, R3, and R4 are preferably independently selected from: H and Me.

1,4,7-Trimethyl-1,4,7-triazacyclononane (Me$_3$-TACN) and 1,2-bis-(4,7-dimethyl-1,4,7,-triazacyclonon-1-yl)-ethane (Me$_4$-DTNE) are most preferred.

Cyclam and Cross Bridged Ligands

The cyclam and cross bridged ligands are preferably in the form of a manganese transition metal catalyst.

The cyclam ligand is preferably of the form:

(IV)

wherein: Q is independently selected from:

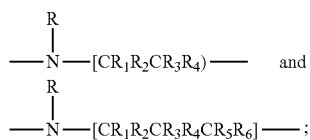

p is 4;

R is independently selected from: hydrogen, C1-C6-alkyl, CH2CH2OH, pyridin-2-ylmethyl, and CH2COOH, or one of R is linked to the N of another Q via an ethylene bridge;

R1, R2, R3, R4, R5 and R6 are independently selected from: H, C1-C4-alkyl, and C1-C4-alkylhydroxy.

Preferred non-cross-bridged ligands are 1,4,8,11-tetraazacyclotetradecane (cyclam), 1,4,8,11-tetramethyl-1,4,8,11-tetraazacyclotetradecane (Me4cyclam), 1,4,7,10-tetraazacyclododecane (cyclen), 1,4,7,10-tetramethyl-1,4,7,10-tetraazacyclododecane (Me4cyclen), and 1,4,7,10-tetrakis(pyridine-2ylmethyl)-1,4,7,10-tetraazacyclododecane (Py4cyclen). With Py4cyclen the iron complex is preferred.

A preferred cross-bridged ligand is of the form:

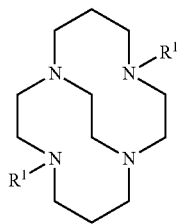
(V)

wherein "R¹'" is independently selected from H, and linear or branched, substituted or unsubstituted C1 to C20 alkyl, alkylaryl, alkenyl or alkynyl; and all nitrogen atoms in the macropolycyclic rings are coordinated with the transition metal.

Preferably R1=Me, which is the ligand 5,12-dimethyl-1,5,8,12-tetraaza-bicyclo[6.6.2]hexadecane of which the complex [Mn(Bcyclam)Cl$_2$] may be synthesised according to WO98/39098.

Other suitable crossed bridged ligands are also found in WO98/39098.

TRISPICEN-Type

The trispicens are preferably in the form of an iron transition metal catalyst.

The trispicen type ligands are preferably of the form:

R17R17N—X—NR17R17 (VI), wherein:

X is selected from —CH$_2$CH$_2$—, —CH$_2$CH$_2$CH$_2$—, —CH$_2$C(OH)HCH$_2$—; and, R17 independently represents a group selected from: R17 and alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and N⁺(R19)$_3$, wherein R19 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —CY$_2$—R18, in which Y is independently selected from H, CH3, C2H5, C3H7 and R18 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least two of R17 are —CY$_2$—R18.

The heteroatom donor group is preferably pyridinyl optionally substituted by —C0-C4-alkyl.

Other preferred heteroatom donor groups are imidazol-2-yl, 1-methyl-imidazol-2-yl, 4-methyl-imidazol-2-yl, imidazol-4-yl, 2-methyl-imidazol-4-yl, 1-methyl-imidazol-4-yl, benzimidazol-2-yl and 1-methyl-benzimidazol-2-yl.

Preferably three of R17 are CY$_2$—R18.

The ligand Tpen (i.e. N,N,N',N'-tetra(pyridin-2-yl-methyl) ethylenediamine) is disclosed in WO97/48787.

The following are preferred trispicens: N-methyl-tris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-butyl-N,N',N'-tris(pyridin-2-ylmethyl)ethylene-1,2-diamine; N-octyl-N,N',N'-tris(pyridin-2-ylmethyl)ethyl ene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-Methyl-N,N',N'-Tris(imidazol-2ylmethyl)-ethylenediamine; N-ethyl-N,N',N'-Tris(imidazol-2ylmethyl)-ethylenediamine; N,N'-dimethyl-N,N'-bis(imidazol-2-ylmethyl)-ethylenediamine; N-(1-propan-2-ol)-N,N',N'-Tris(imidazol-2ylmethyl)-ethylenediamine; N-(1-propan-2-ol)-N,N',N'-Tris(1-methyl-imidazol-2ylmethyl)-ethylenediamine; N,N-diethyl-N',N'',N''-Tris(5-methyl-imidazol-4ylmethyl)-diethylenetriamine; N-(3-propan-1-ol)-N,N',N'-Tris(1-methyl-imidazol-2-ylmethyl)-ethylenediamine; N-hexyl-N,N',N'-Tris(imidazol-2ylmethyl)-ethylenediamine; N-methyl-N,N',N'-tris(benzimidazol-2ylmethyl)-ethylenediamine; and, N-(3-propan-1-ol)methyl-N,N',N'-tris(benzimidazol-2ylmethyl)-ethylenediamine.

Other suitable trispicens are found in WO02/077145.

Of the non-bispidon type primary accelerators the following are most preferred: 5,12-dimethyl-1,5,8,12-tetraaza-bicyclo[6.6.2]hexadecane, 5,12-dibenzyl-1,5,8,12-tetraaza-bicyclo[6.6.2]hexadecane, 1,4,8,11-tetraazacyclotetradecane, 1,4,8,11-tetramethyl-1,4,8,11-tetraazacyclotetradecane, 1,4,7,10-tetraazacyclododecane, 1,4,7,10-tetramethyl-1,4,7,10-tetraazacyclododecane, and 1,4,7,10-tetrakis(pyridine-2ylmethyl)-1,4,7,10-tetraazacyclododecane, N,N-bis(pyridin-2-yl-methyl)-bis(pyridin-2-yl)methylamine, N,N-bis(pyridin-2-yl-methyl-1,1-bis(pyridin-2-yl)-1-aminoethane, N,N,N',N'-tetra(pyridin-2-yl-methyl)ethylenediamine, N-methyl-tris(pyridin-2-ylmethyl)ethylene-1,2-diamine; N-butyl-N,N',N'-tris(pyridin-2-ylmethyl)ethylene-1,2-diamine;

N-octyl-N,N',N'-tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-methyl-N,N',N'-tris(imidazol-2ylmethyl)-ethylenediamine; N-ethyl-N,N',N'-tris(imidazol-2ylmethyl)-ethylenediamine; N,N'-dimethyl-N,N'-bis(imidazol-2-ylmethyl)-ethylenediamine; N-(1-propan-2-ol)-N,N',N'-tris(imidazol-2ylmethyl)-ethylenediamine; N-(1-propan-2-ol)-N,N',N'-tris(1-methyl-imidazol-2ylmethyl)-ethylenediamine; N,N-diethyl-N',N'',N''-tris(5-methyl-imidazol-4ylmethyl)-diethylenetriamine; N-(3-propan-1-ol)-N,N',N'-tris(1-methyl-imidazol-2-ylmethyl)-ethylenediamine; N-hexyl-N,N',N'-tris(imidazol-2ylmethyl)-ethylenediamine; N-methyl-N,N',N'-tris(benzimidazol-2ylmethyl)-ethylenediamine; and, N-(3-propan-1-ol)methyl-N,N',N'-tris(benzimidazol-2ylmethyl)-ethylenediamine; 1,4-bis(quinolin-2-ylmethyl)-7-octyl-1,4,7-triazacyclononane; 1,4-bis(quinolin-2-ylmethyl)-7-ethyl-1,4,7-triazacyclononane; 1,4-bis(quinolin-2-ylmethyl)-7-methyl-1,4,7-triazacyclononane; 1,4-bis(pyridyl-2-methyl)-7-octyl-1,4,7-triazacyclononane; 1,4-bis(pyridyl-2-methyl)-7-ethyl-1,4,7-triazacyclononane; 1,4-bis(pyridyl-2-methyl)-7-methyl-1,4,7-triazacyclononane; 1,4-bis(pyrazol-1-ylmethyl)-7-octyl-1,4,7-triazacyclononane; 1,4-bis(pyrazol-1-ylmethyl)-7-ethyl-1,4,7-triazacyclononane; 1,4-bis(pyrazol-1-ylmethyl)-7-methyl-1,4,7-triazacyclononane, 3,5-dimethylpyrazol-1-ylmethyl)-7-octyl-1,4,7-triazacyclononane; 3,5-dimethylpyrazol-1-ylmethyl)-7-ethyl-1,4,7-triazacyclononane; 3,5-dimethylpyrazol-1-ylmethyl)-7-methyl-1,4,7-triazacyclononane; 1,4-bis(1-methylimidazol-2-ylmethyl)-7-octyl-1,4,7-triazacyclononane; 1,4-bis(1-methylimidazol-2-ylmethyl)-7-ethyl-1,4,7-triazacyclononane; 1,4-bis(1-methylimidazol-2-ylmethyl)-7-methyl-1,4,7-triazacyclononane; and 1,4,7-tris(quinolin-2-ylmethyl)-1,4,7-triazacyclononane; 1,4,7-tris(pyridin-2-ylmethyl)-1,4,7-triazacyclononane, 1,4,7-trimethyl-1,4,7-triazacyclononane ($Me_3$-TACN), 1,2-bis-(4,7-dimethyl-1,4,7-triazacyclonon-1-yl)-ethane ($Me_4$-DTNE).

The primary accelerator is most preferably present in the form of a solution; the solvent is preferably a polar solvent. Preferred examples of the polar solvent are: propylene glycol, ethylene glycol, propylene glycol, ethanol, isopropyl alcohol and acetonitrile. Preferably the primary accelerator is present in the polar solvent in the range 1 to 0.01 wt % based upon metal, more preferably 1 to 0.1 wt %.

Co-Accelerator (a Secondary Accelerator)

The liquid curable medium may contain a co-accelerator (a secondary accelerator).

Examples of a co-accelerator are:
(1) Metal systems: typically include metal carboxylates, acetylacetonates, dicyclopentadienes, complexes, and derivatives thereof containing cobalt (preferably at low levels if Co used), manganese, copper, iron, zinc, vanadium, nickel, tin, magnesium, titanium, potassium, lithium, and others.
(2) Amines: typically include nitrogen containing compounds such as derivatives of aniline, various amides, aromatic and aliphatic amines; e.g., dimethylaniline, diethylaniline, 2-aminopyridine, phenyldiethanolamine, dimethyl-p-toluidine, dimethylacetyacetoamide, acetoacetanilide, bipyridyl, N-(2-hydroxyethyl)-N-methyl-para-toluidine etc.
(3) Oxygen Containing Compounds: typically include oxygenated organic compounds carrying an aldehyde, ketone, ether, ester or alcohol groups capable forming a complex with a metal salt. In particular, keto- and aldo-esters and ethers or alcohols, 1,3-diketones and aldehydes, 1,2-diketones, and certain polyalcohols and other alcohols; e.g., ethyl acetylacetonate, mono- and diesters of ketoglutaric acid, esters of pyrvic acid, glucose, fructose, actylacetone, benzoylaceetone, dibenzoylmethane, diethylmalonate, diacetyl, glyoxal, diethyleneglycol, benzylglycol, ascorbic palmitate etc.
(4) Thiol Compounds: Thiol compounds include mercaptans and more preferably materials containing at least two thiol groups, and their adducts with anhydride or epoxides all of which are capable of forming complexes with metal salts; e.g., n-dodecylmercaptan, tertdodecylmercaptan, 2-mercaptoethanol, dipentene dimercaptan, ethylcyclohhexyl dimercaptan, ethylene-1,2-bis-3-mercaptate, 1,2,6-hexanetrithiol, tetramercaptoacetate, thioesters of polyalcohols, etc.
(5) Quaternary salts: Capable of forming complexes with metal salts; e.g., trimethyl benzyl ammonium chloride, tris-(p-chlorophenyl)-benzyl phosphonium chloride, tetrakismathylol phosphonium chloride, ammonium acetate, ammonium octoate, etc.
(6) Phosphourous Containing Compounds: Capable of forming complexes with metal compounds including alkyl acid phosphites, alkyl acid phosphates, phosphoric acid, hypophosphorous acid, phosphorous acid, trialkyl phosphates, and triaryl phosphates; e.g., tri(2-ethylhexyl) phosphite, dibutyl phosphate, benzene phosphinic acid, dihexyl phosphite, etc.
(7) Lewis Acids: e.g., boron fluoride dehydrate, ferric choloride, perchloric acid, etc.
(8) Bases: e.g., tetraethanol ammonium hydroxide, tetramethylammonium hydroxide, etc.
(9) Others: do not fall into above categories, but have been found to have some promotive effect on certain peroxy catalysts; e.g., sodium sulfoxylate formaldehyde, chlorotriphenyl methane, ascorbic acid, isoascorbic acid, etc.

Peroxide

The resin compositions according to the present invention are being curable with a peroxide compound. The compounds used for the initiation can be any peroxide known to the skilled person for being used in curing of unsaturated polyester, vinyl ester or acrylic resins. Such peroxides include organic and inorganic peroxides, either solids or liquids, and also hydrogen peroxide may be applied. Examples of suitable peroxides are for example, —OCOO— (peroxy carbonates), —C(O)OO— (peroxyesters), —C(O)OOC(O)— (dialkylperoxides), —OO— (dialkylperoxides) and the like. These peroxides can also be oligomeric or polymeric of nature. An extensive list of suitable peroxide compounds can be found, a. o., in US/2002/00912412A, paragraph [0018].

Preferably the peroxide is chosen from the group of organic peroxides. Examples of suitable peroxides are tertiary alkyl-hydroperoxides (such as t-butyl-hydroperoxide), other hydroperoxides (such as cumylhydroperoxide), ketone peroxides (such as formed by mixing ketones with hydrogen peroxide, like acetylacetone peroxide or methylethylketone peroxide), peroxyesters, or peracids (such as t-butyl peresters, benzoyl peroxide, peracetates, perbenzoates, laurylperoxide, peroxy diethylether. Often the organic peroxides used as curing agent are tertiary peresters or tertiary hydroperoxides, i.e. peroxy moieties having the tertiary carbon directly bound to the OO— acyl or OOH group. Also mixtures of various peroxy compounds may be applied.

Preferred is to use a liquid peroxyester, a liquid hydroperoxide or a liquid mixture of hydroperoxides. Handling of liquid peroxides is generally easier; mixing is easier and the rate of dissolution into the resin to be cured is higher. Most preferred is to use a liquid ketone peroxide, specifically methyl ethyl ketone peroxide (MEKP).

In a preferred embodiment of the invention, the resin composition according to the invention also contains one or more reactive diluents, preferably in an amount of at least 5 weight %. Such reactive diluents are especially relevant for reducing the viscosity of the resin in order to improve handling properties, particularly for being used in techniques like vacuum injection, spraying, etc. However, the amount of such reactive diluent in the resin composition according to the invention is not critical. Preferably, the reactive diluent is a methacrylate and/or styrene.

In a yet preferred embodiment the resin composition also contains one or more radical inhibitors selected from preferably chosen from the group of phenolic compounds, stable radicals, like galvinoxyl, N-oxyl based compounds, chatechols and/or phenothiazines. The amount of radical inhibitor used may vary depending on the gel time that needs to be achieved. Preferably the phenolic inhibitor is dosed in the range from 0.0001 to 10% by weight, calculated on the total weight of the primary resin system of the resin composition. More preferably, the amount of radical inhibitor is in the resin composition is in the range of from 0.001 to 1% by weight.

Suitable examples of radical inhibitors that can be used are 2-methoxyphenol, 4-methoxyphenol, 2,6-dibutyl-4-methylphenol, 2,6-dibutylphenol, 2,4,6-trimethyl-phenol, 2,4,6-trimethyl-phenol, 2,4,6-tris-dimethylaminomethyl-phenol, 4,4'-thio-bis(3-methyl-6-t-butylphenol), 4,4'-isopropylidine diphenol, 2,4-dit-butylphenol, 6,6'-di-t-butyl-2,2'-methylene-di-p-cresol, hydroquinone, 2-methyl-hydroquinone, 2,5-di-t-butyl-hydroquinone, 2,6-di-t-butyl-hydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, naphtaquinone, 1-oxyl-2,2,6,6-tetramethylpiperidine (TEMPO), 1-oxyl-2,2,6,6-tetramethylpiperidine-4-ol (TEMPOL), 1-oxyl-2,2,6,6-tetramethylpiperidine-4-one (TEMPON), 1-oxyl-2,2,6,6-tetramethyl-4carboxyl-piperidine (4-carboxy-TEMPO), 1-oxyl-2,2,5,5-tetramethylpyrrolidine, 1-oxyl-2,2,5,5-tetramethyl-3-carboxypyrrolidine, aluminium-N-nitrosophenyl hydroxylamine, diethylhydroxylamine, phenothiazine and/or derivatives or combinations of any of these radical inhibitors.

The unsaturated polyester resin, vinyl ester resin, and acrylic resin compositions according to the present invention can be applied in all applications as are usual for such types of resins. In particular they can be suitably used in closed mould applications, but they can also be used in open mold applications. For closed mold applications it is especially important that the manufacturer of the closed mold products reliably can use favorable properties of the resins according to the invention. End segments where the unsaturated polyester resin, vinyl ester resin, or acrylic resin compositions according to the present invention can be applied include marine applications, chemical anchoring, construction, relining, roofing, flooring, windmill blades, containers, tanks, pipes, automotive parts, corrosion, electrical, transportation, etc. That is to say, the resins according to the invention can be used in all known uses of unsaturated polyester resins, vinyl ester resins, and acrylic resins.

The present invention further also relates to a process for radically curing a resin composition according to the invention by adding peroxide to the resin composition and affecting the cobalt-free curing. It has been found that iron or manganese complexes of a tridentate, tetradentate, pentadentate or hexadentate nitrogen donor ligands, e.g. a tetradentate, pentadentate or hexadentate nitrogen donor ligands, accelerates the radically curing of unsaturated polyester resins, vinyl ester resins, and acrylic resins. Preferably the curing takes place at a temperature between −20 and +200° C., preferably in the range between −20 and +100° C., and most preferably in the range from −10 to +60° C. (so-called cold curing).

The present invention also relates to a two-component composition comprising a first component and second component wherein the first component being the unsaturated polyester resin, vinyl ester resin, or acrylic resin composition according to the present invention and the second component comprises a peroxide compound. As used herein, the term "two-component system" refers to systems where two components (A and B) are being physically separated from each other, for instance in separate cartridges or the like and is intended to include any system wherein each of such two separate components (A and B) may contain further separate components. The components are combined at the time the system is used.

The present invention also relates to a three-component composition comprising a first component, a second component, and a third component wherein the first component comprises the unsaturated polyester resin, vinyl ester resin, or acrylic resin as previously described, the second component being one or combination of the iron or manganese complexes of a tridentate, tetradentate, pentadentate or hexadentate, e.g. a tetradentate, pentadentate or hexadentate nitrogen donor ligands accelerators according to the present invention and the third component comprises a peroxide compound. As used herein, the term "three-component system" refers to systems where three components (A. B and C) are being physically separated from each other, for instance in separate cartridges or the like and is intended to include any system wherein each of such three separate components (A, B and C) may contain further separate components. The components are combined at the time the system is used.

The present invention further also relates to all cured gel coats and molded composites as are being obtained when curing the unsaturated polyester resin, vinyl ester resin, or acrylic resin according to the invention. Where gel coat includes pigmented or non-pigmented gel coats, as well as, in-mold coatings, preferably for marine, sanitary, or automotive applications the have a film thickness of up to 0.75 mm and appropriate weather resistance, hydrolytic stability, and mechanical properties. Where molded composites are considered to have a thickness of at least 0.5 mm and appropriate mechanical properties, preferably as reinforced composite products, and used in the field of chemical anchoring, construction, roofing, flooring, marine applications, windmill blades, containers, tanks, pipes, boats, corrosion, electrical, transportation, aerospace, etc.

EXPERIMENTAL

All experiments described below were performed using base resins of commercially available promoted resins that may be considered to be representative for unsaturated polyester resins and vinyl ester resins. The base resins contain only polymer, reactive diluent, and about 100 ppm inhibitor(s) for shelf life stability. An acrylic base resin comprising of an acrylic monomer and modified acrylic resin is also included. The table below lists the base resin designation, general resin type, reactive diluent, concentration of reactive diluent, manufacturer and typical end use application.

| Base Resin Designation | General Resin Type | Reactive Diluent | Conc. (%) | Manufacturer | End Use Application |
|---|---|---|---|---|---|
| X4545-50 | DCPD | Styrene | 38.5 | Reichhlold | Filled Tub & Shower |
| 6000-T25 | V.E. | Styrene | 33.1 | Ashland | Marine |
| X4545-51 | Iso/DCPD | Styrene | 27.5 | Reichhold | Marine laminate |
| T707-70 | Iso/NPG | Styrene | 30.1 | AOC | Gel coat |
| 44325-00 | Ortho | Styrene | 27.5 | Reichhold | Casting |
| 91690-00 | Acrylic | EOTMPTA | 50 | Reichhold | — |

DCPD = Dicyclopentadiene;
Iso = Isophthalic;
V.E. = Vinyl Ester;
Ortho = Orthophthalic;
NPG = Neopentylglycol;
EOTMPTA = ethoxylated tirmethylolpropane tiracrylate The iron and manganese complexes used in the experiments were obtained as given below.

Dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1) and the iron(II) complex thereof [Fe(N2py3o-C1)Cl]Cl was prepared as described in WO0248301.

Dimethyl 2,4-di-(2-pyridyl)-3-octyl-7-(pyridin-2-ylmethyl)-3,7-diaza-bicyclo[3.3.1]nonan-9-one-1,5-dicarboxylate (N2py3o-C8), Dimethyl 2,4-di-(2-pyridyl)-3-dodecyl-7-(pyridin-2-ylmethyl)-3,7-diaza-bicyclo[3.3.1]nonan-9-one-1,5-dicarboxylate (N2py3o-C12), and Dimethyl 2,4-di-(2-pyridyl)-3-octadecyl-7-(pyridin-2-ylmethyl)-3,7-diaza-bicyclo[3.3.1]nonan-9-one-1,5-dicarboxylate (N2py3o-C18) and the corresponding iron complexes, [Fe(N2py3o-C8)Cl]Cl, [Fe(N2py3o-C12)Cl]Cl and [Fe(N2py3o-C18)Cl]Cl, were prepared as described in WO 2005042532.

Dimethyl 2,4-di-(2-pyridyl)-3-methyl-7-(N,N-dimethyl-amino-ethyl)-3,7-diaza-bicyclo[3.3.1]nonan-9-one-1,5-dicarboxylate (N2Py2EtNMe2) and its corresponding iron complex (FeCl(N2Py2C2H4NMe2)]Cl) were prepared as described as disclosed in WO 03/104379.

N,N-bis(pyridin-2-yl-methyl-1,1-bis(pyridin-2-yl)-1-aminoethane, hereafter referred to as MeN4Py, and the corresponding iron(II) complex, [Fe(MeN4py)Cl]Cl, were prepared as described in EP0909809.

4,11-dimethyl-1,4,8,11-tetraazabicyclo[6.6.2]hexadecane, hereafter referred to as Bcyclam, and the corresponding manganese(II) complex, [Mn(Bcyclam)Cl$_2$], were prepared as described in WO98/39098 and J. Am. Chem. Soc., 122, 2512 (2000)).

N-methyl-trispicen (Metrispicen was synthesised according to literature procedures (Bernal, J.; et al. J. Chem. Soc., Dalton Trans. 1995, 3667) and GB2386615. The corresponding iron(II) complex, [Fe(Metrispicen)Cl]PF6 was prepared similarly to the procedure described in EP0909809 for the MeN4py analog.

1,4-bis(quinolin-2-ylmethyl)-7-ethyl-1,4,7-triazacyclononane (Quin$_2$TACN) and the corresponding [Fe(Quin$_2$TACN)Cl]ClO$_4$ compound were prepared as disclosed in EP1259522.

[Mn$_2$O$_3$(Me$_3$tacn)$_2$](PF$_6$)$_2$ was prepared as described elsewhere (J. H. Koek et al., J. Chem. Soc., Dalton Trans, 353, 1996).

All iron/manganese complex accelerators were initially diluted to 0.5 to 4 percent with diethylene glycol (DEG) or propylene glycol (PG) for incorporation into the resins.

The cobalt 2-ethylhexanoate used for the comparative reference cobalt accelerator is a commercial product and was obtained from OMG; 12% Cobalt Hex-Cem (code 115086).

The peroxide initiators DMA and AA used in the experiments were obtained from Sigma-Aldrich: 2-Butanone peroxide 35 wt % in TXIB (a.k.a. Methyl ethyl ketone peroxide (MEKP)); Cumene Hydroperoxide, 88%; Benzoyl Peroxide (BPO)~50 wt % blended in tricresyl phosphate; Acetylacetone (a.k.a. 2,4-Pentanedione) ≥99%; and, N,N-Dimethylaniline (DMA).

For all examples, concentrations of accelerators are given in parts per million (ppm) wt/wt, where the weight of the accelerators is "based on metal" with the exception of DMA and acetylacetone (AA). Concentrations of initiators are given as percent based on overall solution or paste weight. Gel time was determined using a Techne Gel Time Recorder with a 10 mm diameter stainless steel plunger and a 15 gram sample mass in a 24 mL glass vial for all experiments. The peak exotherm time and peak exotherm temperature was determined using a thermocouple and data logger inserted into the same sample. An offset time was added to the gel and peak exotherm times to account for the mixing of the initiator and initial experimental set-up. All equipment and samples were placed in a steady state chamber set to 25° C. and 50% humidity unless otherwise specified.

Example 1

Reactivity of all Classes of Mn/Fe Complexes

Samples of X4545-50 DCPD base resin was promoted with 20 ppm accelerator (based on metal) and then initiated with 1.5% methyl ethyl ketone peroxide (MEKP). Accelerators tested represent all six classes of claimed compounds. A total mass of 15.0 grams was used to determine the gel time of the resin. An unpromoted resin control without accelerators was also included as a control. The gel time results are shown in Table 1, below:

TABLE 1

| Accelerator | Gel Time (minutes) |
|---|---|
| None | >1000 |
| [Fe(N2py3o-C1)Cl]Cl | 7.9 |
| [Fe(N2py3o-C8)Cl]Cl | 5.1 |
| [Fe(N2py3o-C12)Cl]Cl | 4.9 |
| [Fe(N2py3o-C18)Cl]Cl | 4.5 |
| [Fe(N2py2-C2H4NMe2)Cl]Cl | 45.5 |
| [Fe(MeN4py)Cl]Cl | 14.0 |
| [Fe(quinTACN)Cl]ClO4 | 35.9 |
| [Fe(Metrispicen)Cl]PF6 | 30.2 |
| [Mn(Bcyclam)]Cl2 | 37.3 |

The results in Table 1 show that all six classes of the described iron or manganese complexes of a tetradentate, pentadentate or hexadentate nitrogen donor ligands act as primary accelerators with MEKP. All the accelerators showed good cure properties for gel time in a standard unsaturated polyester resin, especially with 15 gram mass. In general, the Bispidon-type catalysts are the most active accelerators of the group based on the resin/initiator system used in this example. The resin control without accelerator did not gel or cure. All the samples cured to a solidified material with the exception of the unpromoted control.

Example 2

Reactivity at Low Concentrations

The T707-70 Iso/NPG and 440325-00 Ortho base resins were promoted with 0.5 ppm Fe ([Fe(N2py3o-C1)Cl]Cl) accelerator and then initiated with 1.5% MEKP. The gel time of the promoted resins was determined as in Example 1 using a 15 gram mass. The results are shown in Table 2, below:

TABLE 2

| Resin | Accelerator | Gel Time (minutes) |
|---|---|---|
| T707-70 Iso/NPG | 0.5 ppm Fe ([Fe(N2py3o-C1)Cl]Cl) | 6.2 |
| 44325-00 Ortho | 0.5 ppm Fe ([Fe(N2py3o-C1)Cl]Cl) | 7.3 |

The results in Table 2 show that the [Fe(N2py3o-C1)Cl]Cl accelerator produces good cure properties at low concentrations, 0.5 ppm Fe, in typical unsaturated polyester resin systems initiated with MEKP. Both samples cured to a solidified material

Example 3

Control of Gel/Cure Times, Comparative Reactivity to Cobalt, Low Concentrations Compared to Cobalt Samples of 6000-T25 vinyl ester base resin was promoted with a range of iron accelerator concentrations using [Fe(N2py3o-C1)Cl]Cl. In another set of experiments, the 6000-T25 vinyl ester resin was promoted with a range of cobalt concentrations using 12% Cobalt Hex-Cem for a comparative reference. All the promoted resin samples were initiated with 1.5% MEKP and the gel time, peak exotherm time, and peak exotherm temperature determined. The results are shown in Table 3 (below):

TABLE 3

| Accelerator | Gel Time (minutes) | Peak Exotherm Time (minutes) | Peak Exotherm Temp (° C.) |
|---|---|---|---|
| 0.4 ppm Fe ([Fe(N2py3o-C1)Cl]Cl) | 370.9 | 463.1 | 27 |
| 0.6 ppm Fe ([Fe(N2py3o-C1)Cl]Cl) | 66.0 | 114.9 | 31 |
| 0.8 ppm Fe ([Fe(N2py3o-C1)Cl]Cl) | 32.4 | 65.8 | 46 |
| 1.1 ppm Fe ([Fe(N2py3o-C1)Cl]Cl) | 19.8 | 43.5 | 77 |
| 1.7 ppm Fe ([Fe(N2py3o-C1)Cl]Cl) | 11.9 | 25.6 | 127 |
| 2.1 ppm Fe ([Fe(N2py3o-C1)Cl]Cl) | 10.4 | 25.3 | 122 |
| 4.3 ppm Fe ([Fe(N2py3o-C1)Cl]Cl) | 10.0 | 28.0 | 118 |
| 10.6 ppm Fe ([Fe(N2py3o-C1)Cl]Cl) | 17.7 | 35.0 | 145 |
| 19.3 ppm Fe ([Fe(N2py3o-C1)Cl]Cl) | 24.8 | 115.0 | 64 |
| 42.2 ppm Fe ([Fe(N2py3o-C1)Cl]Cl) | 136.6 | 517.1 | 27 |
| 10.4 ppm Co (12% Co Hex-Cem) | >1000 | N.A. | N.A. |
| 52.0 ppm Co (12% Co Hex-Cem) | 165.2 | 197.2 | 95 |
| 106 ppm Co (12% Co Hex-Cem) | 121.1 | 140.8 | 103 |
| 256 ppm Co (12% Co Hex-Cem) | 59.0 | 87.9 | 123 |
| 526 ppm Co (12% Co Hex-Cem) | 31.4 | 55.9 | 133 |
| 1017 ppm Co (12% Co Hex-Cem) | 24.4 | 50.0 | 135 |

The [Fe(N2py3o-C1)Cl]Cl results in Table 3 show that the gel/cure reaction can be controlled by varying accelerator concentration. The gel/peak exotherm data represents the entire accelerator concentration range from under promoted to over promoted with vinyl ester resin and using 1.5% MEKP. A concentration of about 2 ppm Fe [Fe(N2py3o-C1)Cl]Cl optimizes the system based on gel time and peak exotherm temperature.

The 12% Cobalt Hex-Cem results in Table 3 serve as a comparative benchmark for comparison of the [Fe(N2py3o-C1)Cl]Cl accelerator. In general, the [Fe(N2py3o-C1)Cl]Cl accelerator was significantly more reactive than 12% Cobalt Hex-Cem on a metal concentration basis. 1.7 ppm Fe [Fe(N2py3o-C1)Cl]Cl and 256 ppm Co (12% Cobalt Hex-Cem) produced similar peak exotherm temperatures of 127° C. and 123° C., respectively. Significantly lower concentrations of [Fe(N2py3o-C1)Cl]Cl produced consistently faster gel and peak exotherm times compared to 12% Cobalt Hex-Cem (based on metal). All the samples in both data sets cured to a solidified material with the exception of the sample promoted with 10 ppm cobalt.

Example 4

Acrylic Resin with acrylate diluent

Samples of 91690-00 acrylic base resin were promoted with 0.5 ppm Fe and 20 ppm Fe [Fe(N2py2-C2H4NMe2)Cl]Cl, 0.5 ppm Fe and 20 ppm Fe of [Fe(N2py2-C2H4NMe2)Cl]Cl, 250 ppm Co (12% Cobat Hex-Cem) and 5000 ppm N,N-dimethylaniline (DMA). All the samples were initiated with 1.5% MEKP with the exception of DMA promoted sample, which was initiated with 2.0% BPO. The cobalt and DMA promoted samples were included for comparative references. Gel time and peak exotherm temperature was determined for all the initiated samples. The results are summarized in Table 4 (below):

TABLE 4

| Initiator | Accelerator | Gel Time (minutes) | Peak Exotherm Temp (° C.) |
|---|---|---|---|
| 1.5% MEKP | 0.5 ppm Fe ([Fe(N2py2-C2H4NMe2)Cl]Cl) | 10.2 | 77 |
| 1.5% MEKP | 20 ppm Fe ([Fe(N2py2-C2H4NMe2)Cl]Cl) | <0.3 | Too fast |
| 1.5% MEKP | 0.5 ppm Fe ([Fe(N2py3o-C1)Cl]Cl) | 53.9 | 27 |
| 1.5% MEKP | 20 ppm Fe ([Fe(N2py3o-C1)Cl]Cl) | <0.5 | Too fast |
| 1.5% MEKP | 250 ppm Co (12% Cobalt Hex-Cem) | >1000 | N.A. |
| 2.0% BPO | 5000 ppm DMA | 2.4 | 95 |

The results in Table 4 show [Fe(N2py2-C2H4NMe2)Cl]Cl and [Fe(N2py3o-C1)Cl]Cl accelerators are reactive in acrylic resins with acrylate reactive diluents when used with a MEKP initiator. [Fe(N2py2-C2H4NMe2)Cl]Cl was more reactive than the [Fe(N2py3o-C1)Cl]Cl based on peak exotherm temperature. Both formulations with 20 ppm Fe gelled before mixing of initiator was completed. Comparatively, the sample promoted with 250 pppm Co and initiated with 1.5% MEKP did not gel or cure. Both the [Fe(N2py2-C2H4NMe2)Cl]Cl/MEKP and [Fe(N2py3o-C1)Cl]Cl/MEKP system showed the potential to be more reactive than a typical DMA/BPO system in acrylic resins. All the samples cured to a solidified material with the exception of the sample promoted with 250 ppm Co.

Example 5

Low Temperature

The environmental chamber was set to 25° C., 10° C., and 0° C. testing temperatures for the experiments in this example.

Triplicate samples of X4545-50 DCPD base resin was promoted with 20 ppm Fe [Fe(N2py3o-C1)Cl]Cl. The 10° C. test temperature sample was let stand at −10° C. before initiation with 1.5% MEKP and placement into the environmental chamber. The 0° C. test temperature sample was let stand at −30° C. before initiation with 1.5% MEKP and placement into the environmental. The lower standing temperatures allowed the resin temperature to closely match the testing temperature after addition and mixing of the initiator. As a comparative reference, triplicate X4545-50 DCPD base resin samples were promoted with 100 ppm Co (12% Cobalt Hex-Cem). The testing protocol was the same as the previous sample set with 1.5% MEKP initiator. A 15 gram mass was used to determine the gel time, peak exotherm time, and peak exotherm temperature. The results are shown in Table 5 (below):

TABLE 5

| Accelerator | Test Temp (° C.) | Gel Time (min) | Peak Exotherm Time (min) | Peak Exotherm Temp (° C.) | Temp Difference (Δ ° C.) |
|---|---|---|---|---|---|
| 20 ppm Fe ([Fe(N2py3o-C1)Cl]Cl) | 25 | 7.9 | 17.3 | 71 | 46 |
| 20 ppm Fe ([Fe(N2py3o-C1)Cl]Cl) | 10 | 20.8 | 49.5 | 20 | 10 |
| 20 ppm Fe ([Fe(N2py3o-C1)Cl]Cl) | 0 | 36.3 | 52.5 | 6 | 6 |
| 100 ppm Co (12% Cobalt Hex-Cem) | 25 | 28.5 | 47.2 | 77 | 52 |
| 100 ppm Co (12% Cobalt Hex-Cem) | 10 | 96.5 | 155.8 | 14 | 4 |
| 100 ppm Co (12% Cobalt Hex-Cem) | 0 | 293.7 | 299.4 | 2 | 2 |

In general, the results in Table 5 show a strong correlation with test temperature; gel time and peak exotherm time inversely proportional to temperature and peak exotherm temperature and temperature difference directly proportional to temperature. At 25° C., both samples exhibited good gel/cure properties with the [Fe(N2py3o-C1)Cl]Cl promoted sample showing faster gel and peak exotherm times, but the cobalt promoted sample showing a slightly higher exotherm temperature. At sub-ambient temperatures, the samples promoted with 20 ppm Fe ([Fe(N2py3o-C1)Cl]Cl) exhibited significantly better gel/cure properties compared to the samples promoted with 100 ppm Co (12% Cobalt Hex-Cem). At 0° C., gel time of the 20 ppm Fe ([Fe(N2py3o-C1)Cl]Cl) promoted sample was 36.3 minutes compared to 293.7 minutes for the 100 ppm Co (12% Cobalt Hex-Cem) sample. All the samples cured to a solidified material.

Example 6

Usage and Lower Colour

Samples of all the unsaturated polyester base resins and the vinyl ester base resins were promoted with 20 ppm Fe ([Fe(N2py3o-C1)Cl]Cl) and then initiated with 1.5% MEKP. The gel time, peak exotherm time, and peak exotherm temperature of the promoted resins was determined using a 15 gram mass at 25° C. A separate puck was cast for each promoted resin to determine the relative darkness of the cured resin based on the L* axis (black to white) of the CIE L*a*b* color scale. For a comparative reference, the same base resins were promoted with 250 ppm Co (12% Cobalt Hex-Cem), initiated with 1.5% MEKP, and tested using the same protocols as the initial sample set. The results are shown in Table 6:

TABLE 6

| Resin | Accelerator | Gel Time (min) | Peak Exo Time (min) | Peak Exo Temp (° C.) | CIE L*a*b* Color (L*) |
|---|---|---|---|---|---|
| 6000 T-35 V.E. | 19.4 ppm Fe ([Fe(N2py3o-C1)Cl]Cl) | 23.7 | 46.0 | 104 | 77.83 |
| X4545-50 DCPD | 19.7 ppm Fe ([Fe(N2py3o-C1)Cl]Cl) | 8.9 | 16.9 | 98 | 72.87 |
| X4545-51 Iso/DCPD | 19.6 ppm Fe ([Fe(N2py3o-C1)Cl]Cl) | 9.5 | 16.3 | 99 | 74.89 |
| T707-70 Iso/NPG | 19.6 ppm Fe ([Fe(N2py3o-C1)Cl]Cl) | 7.8 | 20.7 | 57 | 77.04 |
| 44325-00 Ortho | 19.8 ppm Fe ([Fe(N2py3o-C1)Cl]Cl) | 4.9 | 12.9 | 71 | 76.75 |
| 6000 T-35 V.E. | 256 ppm Co (12% Cobalt Hex-Cem) | 59.0 | 87.9 | 123 | 63.99 |
| X4545-50 DCPD | 263 ppm Co (12% Cobalt Hex-Cem) | 14.2 | 21.9 | 108 | 52.92 |
| X4545-51 Iso/DCPD | 279 ppm Co (12% Cobalt Hex-Cem) | 26.1 | 48.1 | 56 | NA |
| T707-70 Iso/NPG | 250 ppm Co (12% Cobalt Hex-Cem) | 5.6 | 21.0 | 66 | 68.73 |
| 44325-00 Ortho | 248 ppm Co (12% Cobalt Hex-Cem) | 4.0 | 16.8 | 73 | 68.97 |

A comparison of the gel time, peak exotherm time, and peak exotherm temperature results in Table 6 shows that very similar performance can be achieved with the [Fe(N2py3o-C1)Cl]Cl accelerator compared to a typical cobalt accelerator over a broad range of unsaturated polyester and vinyl ester resins. These results also confirm that significantly lower concentrations of [Fe(N2py3o-C1)Cl]Cl are needed to achieve similar performance compared to cobalt accelerators on a metal basis. The lower [Fe(N2py3o-C1)Cl]Cl accelerator concentration produces an added technical benefit of reduced color in the cured part. A comparison of the L* color values in Table 6 shows castings of resins promoted with 20 ppm Fe ([Fe(N2py3o-C1)Cl]Cl) are significantly lighter in color than the same resins promoted with 250 ppm Co (12% Cobalt Hex-Cem). All the samples and castings cured to a solidified material.

Example 7

Confirmation of Primary Accelerator Status Compared to Other Iron Co-Accelerators Gel time tests using X4545-50 DCPD base resin promoted with 20 ppm iron accelerators (based on metal) were initiated with 1.5% MEKP. The same promoted resin samples were used for a second set of experiments initiated with CHP (cumene hydroperoxide) purchased form Sigma Aldrich. The types and manufacturers of the iron accelerators are listed in the table 7a, below.

TABLE 7a

| Accelerator | Manufacturer |
| --- | --- |
| 20 ppm Fe ([Fe(N2py3o-C1)Cl]Cl) | Rahu Catalytics |
| 20 ppm Fe ([Fe(N2py2-C2H4NMe2)Cl]Cl) | Rahu Catalytics |
| 20 ppm Fe (6% Iron Hex-Cem) | OMG |
| 20 ppm Fe (12% Iron Neo-Nap) | OMG |
| 20 ppm Fe (Fe(II) Acetylacetonate) | Sigma Aldrich |
| 20 ppm Fe (Fe(III) Acetylacetonate) | Sigma Aldrich |
| 20 ppm Fe (Fe(II)Acetate) | OMG |

The gel time, peak exotherm time, and peak exotherm temperature results are shown in Tables 7b & 7c below:

TABLE 7b

| Initiator | Accelerator | Gel Time (minutes) | Peak Exotherm Time (minutes) | Peak Exotherm Temp (° C.) |
| --- | --- | --- | --- | --- |
| 1.5% MEKP | 20 ppm Fe ([Fe(N2py3o-C1)Cl]Cl) | 7.9 | 17.3 | 71 |
| 1.5% MEKP | 20 ppm Fe ([Fe(N2py2-C2H4NMe2)Cl]Cl) | 210.1 | No Exotherm | |
| 1.5% MEKP | 20 ppm Fe (6% Fe Hex-Cem) | Did NOT gel or cure | | |
| 1.5% MEKP | 20 ppm Fe (12% Fe Neo-Nap) | Did NOT gel or cure | | |
| 1.5% MEKP | 20 ppm Fe (Fe(II) Acetylacetonate) | Did NOT gel or cure | | |
| 1.5% MEKP | 20 ppm Fe (Fe(III) Acetylacetonate) | Did NOT gel or cure | | |
| 1.5% MEKP | 20 ppm Fe (Fe(II)Acetate) | Did NOT gel or cure | | |

TABLE 7c

| Initiator | Accelerator | Gel Time (minutes) | Peak Exotherm Time (minutes) | Peak Exotherm Temp (° C.) |
| --- | --- | --- | --- | --- |
| 1.5% CHP | 20 ppm Fe ([Fe(N2py3o-C1)Cl]Cl) | 20.6 | 41.1 | 54 |
| 1.5% CHP | 20 ppm Fe ([Fe(N2py2-C2H4NMe2)Cl]Cl) | 19.1 | 36.2 | 33 |
| 1.5% CHP | 20 ppm Fe (6% Fe Hex-Cem) | Did NOT gel or cure | | |
| 1.5% CHP | 20 ppm Fe (12% Fe Neo-Nap) | Did NOT gel or cure | | |
| 1.5% CHP | 20 ppm Fe (Fe(II) Acetylacetonate) | Did NOT gel or cure | | |
| 1.5% CHP | 20 ppm Fe (Fe(III) Acetylacetonate) | Did NOT gel or cure | | |
| 1.5% CHP | 20 ppm Fe (Fe(II)Acetate) | Did NOT gel or cure | | |

The results in Tables 7b & 7c show only the [Fe(N2py3o-C1)Cl]Cl and [Fe(N2py2-C2H4NMe2)Cl]Cl iron complexes act as primary accelerators and were the only samples to gel and cure to a solidified material.

Example 8

Usage; Process Control with Co-Accelerators

Samples of X4545-50 DCPD base resin were promoted with accelerator(s) as shown in Table 8 (below) and then initiated with 1.5% methyl ethyl ketone peroxide (MEKP). Many of the experiments in this example contain mixtures of [Fe(N2py3o-C1)Cl]Cl and co-accelerators, specifically low concentrations of cobalt. One experiment utilizes a mixture of [Fe(N2py3o-C1)Cl]Cl, 12% Cobalt Hex-Cem, dimethylaniline (DMA) and acetylacetone (AA). Also included were reference experiments promoted with only 12% Cobalt Hex-Cem (100 ppm and 10 ppm Co), as well as, a second set of references promoted with only [Fe(N2py3o-C1)Cl]Cl (20 ppm and 0.6 ppm Fe). The gel time and peak exotherm time results are shown in Table 8, below:

TABLE 8

| Accelerator | | | | | |
| --- | --- | --- | --- | --- | --- |
| 12% Cobalt Hex-Cem (ppm Co) | [Fe(N2py3o-C1)Cl]Cl (ppm Fe) | DMA (ppm) | AA (ppm) | Gel Time (minutes) | Peak Exotherm Time (minutes) |
| 100 | — | — | — | 28.5 | 47.2 |
| 10 | — | — | — | 313.6 | 356.4 |
| — | 20 | — | — | 7.9 | 17.3 |
| — | 0.6 | — | — | 626.6 | No Exotherm |
| 100 | 20 | — | — | 7.8 | 16.2 |
| 50 | 0.5 | — | — | 32.3 | 50.0 |
| 5 | 10 | — | — | 14.0 | 27.8 |
| 5 | 2 | — | — | 56.6 | 75.7 |
| 5 | 2 | 50 | 50 | 28.4 | 45.4 |

The results in Table 8 show that very similar process conditions of gel time and peak exotherm time can be obtained by using mixtures of [Fe(N2py3o-C1)Cl]Cl and co-accelerators. The experiment promoted with 50 ppm cobalt (12% Cobalt Hex-Cem) and 0.5 ppm iron (Fe(N2py3o-C1)Cl]Cl) showed a 32 minute gel time and 50 minute peak exotherm time compared to a 29 minute gel time and 47 minute peak exotherm time for the reference experiment promoted with 100 ppm cobalt. Another experiment promoted with 100 ppm cobalt and 20 ppm iron (Fe(N2py3o-C1)Cl]Cl) produced a gel time of 7.8 minutes, which was very similar to the gel time of the experiment promoted with 20 ppm iron (Fe(N2py3o-C1)Cl]Cl) alone. However, both of these reference experiments produced gel times much faster than the 29 minutes of the 100 ppm cobalt promoted reference benchmark. An accelerator combination of 5 ppm cobalt with 10 ppm iron (Fe (N2py3o-C1)Cl]Cl) slowed the gel time and peak exotherm time to 14 minutes and 28 minutes, respectively. Further reducing the promotion package to 5 ppm cobalt and 2 ppm iron (Fe(N2py3o-C1)Cl]Cl) produced gel and peak exotherm times of 57 minutes and 76 minutes, respectively, which were to slow compared to the 100 ppm cobalt promoted benchmark. The last example in Table 8 shows the use of a combination of co-accelerators to achieve gel and peak exotherm times comparable to the 100 ppm cobalt promoted experiment. In the last example, the DCPD base resin is promoted with low concentrations of 5 ppm cobalt and 2 ppm iron ([Fe(N2py3o-C1)Cl]Cl) combined with 50 ppm DMA and 50 ppm AA to produce a 28.4 minute gel time and 45.4 peak exotherm time, which is very similar to the 28.5 minute gel time and 47.2 minute peak exotherm time of the 100 ppm cobalt promoted benchmark experiment. Also included are reference experiments promoted with 10 ppm cobalt alone and 0.6 ppm iron (Fe(N2py3o-C1)Cl]Cl) alone that showed gel times of 314 minutes and 627 minutes, respectively. These reference experiments also demonstrate the synergistic effects of the co-accelerator combinations formally presented. All the samples cured to a solidified material.

Example 9

Reactivity of [Mn$_2$O$_3$(Me$_3$tacn)$_2$](PF$_6$)$_2$

Samples of X4545-50 DCPD base resin was promoted with 80 ppm accelerator (based on metal) and then initiated with 1.5% methyl ethyl ketone peroxide (MEKP). [Mn$_2$O$_3$(Me$_3$tacn)$_2$](PF$_6$)$_2$ was dissolved in water (1.27% w/w) and this was added to the substrate. A total mass of 15.0 grams was used to determine the gel time of the resin. An unpromoted resin control without accelerator was also included as a control. The gel time of the [Mn$_2$O$_3$(Me$_3$tacn)$_2$](PF$_6$)$_2$ was 215 min (blank did not gel).

Another experiment was done by dissolving [Mn$_2$O$_3$(Me$_3$tacn)$_2$](PF$_6$)$_2$ in diethyleneglycol (4.05%) and this was added to the substrate containing cumylhydroperoxide to yield a concentration of 80 ppm (based on metal). The gel time was now 560 min (blank no gel observed).

A similar experiment, but now using 20 ppm (based on Mn) of the same manganese compound dissolved in diethyleneglycol and 150 ppm ascorbic acid, gave a gel time of 862 min (blank again no gel observed).

The results above show that the manganese catalyst accelerates gel formation of this substrate both with cumylhydroperoxide and with methyl ethyl ketone peroxide. Further, addition of ascorbic to the system allows the level of manganese catalyst to be reduced.

The invention claimed is:
1. A liquid curable medium comprising:
   (i) from 5 to 95 wt % of an unsaturated resin;
   (ii) from 0.001 to 10 wt % of a peroxide;
   (iii) an inert or a reactive organic polar solvent;
   (iv) from 0.00001 and 0.02% wt % based on metal of a primary accelerator, wherein the primary accelerator is an iron or manganese complex of a tridentate, tetradentate, pentadentate or hexadentate nitrogen donor ligand in the inert or reactive organic polar solvent and, wherein the ligand is selected from the group consisting of:

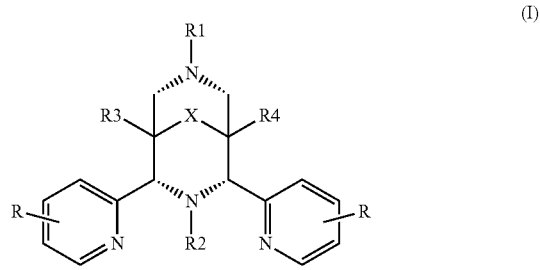

(I)

wherein each R is independently selected from: hydrogen, F, Cl, Br, hydroxyl, C1-C4-alkylO—, —NH—CO—H, —NH—CO—C1-C4-alkyl, —NH2, —NH—C1-C4-alkyl, and C1-C4-alkyl;
R1 and R2 are independently selected from: C1-C24-alkyl, C6-C10-aryl, and a group containing a heteroatom capable of coordinating to a transition metal;
R3 and R4 are independently selected from hydrogen, C1-C8 alkyl, C1-C8-alkyl-O—C1-C8-alkyl, C1-C8-alkyl-O—C6-C10-aryl, C6-C10-aryl, C1-C8-hydroxyalkyl, and —(CH2)$_n$C(O)OR5 wherein R5 is independently selected from: hydrogen, C1-C4-alkyl, n is from 0 to 4, and mixtures thereof; and,
X is selected from C=O, —[C(R6)$_2$]$_y$— wherein y is from 0 to 3 each R6 is independently selected from hydrogen, hydroxyl, C1-C4-alkoxy and C1-C4-alkyl;

(II)

wherein each R$^1$, R$^2$ independently represents —R$^4$-R$^5$,
R$^3$ represents hydrogen, optionally substituted alkyl, aryl or arylalkyl, or —R$^4$-R$^5$,
each R$^4$ independently represents a single bond or optionally substituted alkylene, alkenylene, oxyalkylene, aminoalkylene, alkylene ether, carboxylic ester or carboxylic amide, and
each R$^5$ independently represents an optionally N-substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl and thiazolyl;

(III)

wherein each R20 is selected from: an alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and N⁺(R21)₃, wherein R21 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —CY₂—R22, in which Y is independently selected from H, CH3, C2H5, C3H7 and R22 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least one of R20 is a —CY₂—R22;

  (IV)

wherein: Q is independently selected from:

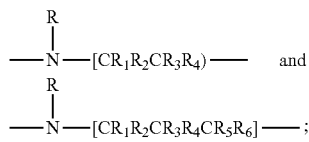 and p is 4;
R is independently selected from: hydrogen, C1-C6-alkyl, CH2CH2OH, pyridin-2-ylmethyl, and CH2COOH;
R1, R2, R3, R4, R5 and R6 are independently selected from: H, C1-C4-alkyl, and C1-C4-alkylhydroxy;

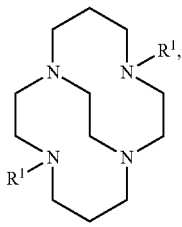  (V)

wherein "R¹" is independently selected from H, and linear or branched, substituted or unsubstituted C1 to C20 alkyl, alkylaryl, alkenyl or alkynyl; and all nitrogen atoms in the macropolycyclic rings are coordinated with the transition metal;

R17R17N—X—NR17R17 (VI), wherein:
X is selected from —CH₂CH₂—, —CH₂CH₂CH₂—, —CH₂C(OH)HCH₂—; and,
R17 independently represents a group selected from: R17 and alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and N⁺(R19)₃, wherein R19 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —CY₂—R18, in which Y is independently selected from H, CH3, C2H5, C3H7 and R18 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl;
and wherein at least two of R17 are —CY₂—R18; and

  (VII)

wherein: Q=

p is 3;
each R is independently selected from: hydrogen, C1-C6-alkyl, CH₂CH₂OH, CH₂COOH, and pyridin-2-ylmethyl or one R is an ethylene bridge to a >NR nitrogen atom of a Q of a second ligand of formula (VII);
R1, R2, R3, and R4 are independently selected from: H, C1-C4-alkyl, and C1-C4-alkylhydroxy.

2. The liquid curable medium composition as claimed in claim 1, wherein in formula (I) the group containing a heteroatom capable of coordinating to a transition metal is pyridin-2-yl optionally substituted by —C0-C4-alkyl.

3. The liquid curable medium composition as claimed in claim 2, wherein the group containing a heteroatom capable of coordinating to a transition metal is unsubstituted pyridinyl.

4. The liquid curable medium composition as claimed in claim 1, wherein in formula (I) X is C=O or C(OH)2.

5. The liquid curable medium composition as claimed in claim 1, wherein in formula (I): R3=R4 and selected from —C(O)—O—CH3, —C(O)—O—CH2CH3, —C(O)—O—CH2C6H5 and CH2OH.

6. The liquid curable medium as claimed in claim 1, wherein in formula (I) at least one of R1 or R2 is pyridin-2-ylmethyl and the other is selected from —CH3, —C2H5, —C3H7, —C4H9, C6H13, C8H17, C12H25, and C18H37.

7. The liquid curable medium as claimed in claim 1, wherein the ligand is selected from 5,12-dimethyl-1,5,8,12-tetraaza-bicyclo[6.6.2]hexadecane, 5,12-dibenzyl-1,5,8,12-tetraaza-bicyclo[6.6.2]hexadecane, 1,4,8,11-tetraazacyclotetradecane, 1,4,8,11-tetramethyl-1,4,8,11-tetraazacyclotetradecane, 1,4,7,10-tetraazacyclododecane, 1,4,7,10-tetramethyl-1,4,7,10-tetraazacyclododecane, and 1,4,7,10-tetrakis(pyridine-2ylmethyl)-1,4,7,10-tetraazacyclododecane, N,N-bis(pyridin-2-yl-methyl)-bis(pyridin-2-yl)methylamine, N,N-bis(pyridin-2-yl-methyl-1,1-bis(pyridin-2-yl)-1-aminoethane, N,N,N',N'-tetra(pyridin-2-ylmethyl)ethylenediamine, N-methyl-tris(pyridin-2-ylmethyl) ethylene-1,2-diamine; N-butyl-N,N',N'-tris(pyridin-2-ylmethyl)ethylene-1,2-diamine; N-octyl-N,N',N'-tris (pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-methyl-N,N',N'-tris(imidazol-2ylmethyl)-ethylenediamine; N-ethyl-N,N',N'-tris(imidazol-2ylmethyl)-ethylenediamine; N,N'-dimethyl-N,N'-bis(imidazol-2-ylmethyl)-ethylenediamine; N-(1-propan-2-ol)-N,N',N'-tris(imidazol-2ylmethyl)-ethylenediamine; N-(1-propan-2-ol)-N,N',N'-tris(1-methyl-imidazol-2ylmethyl)-ethylenediamine; N,N-diethyl-N',N'',N''-tris(5-methyl-imidazol-4ylmethyl)-diethylenetriamine; N-(3-propan-1-ol)-N,N',N'-tris(1-methyl-imidazol-2-ylmethyl)-ethylenediamine; N-hexyl-N,N',N'-tris(imidazol-2yl-methyl)-ethylenediamine; N-methyl-N,N',N'-tris(benzimidazol-2ylmethyl)-ethylenediamine; and, N-(3-propan-1-ylmethyl-N,N',N'-tris(benzimidazol-2ylmethyl)-ethylenediamine; 1,4-bis(quinolin-2-ylmethyl)-7-octyl-1,4,7-triazacyclononane; 1,4-bis(quinolin-2-ylmethyl)-7-ethyl-1,4,7-triazacyclononane; 1,4-bis(quinolin-2-ylmethyl)-7-methyl-1,4,7-triazacyclononane; 1,4-bis(pyridyl-2-methyl)-7-octyl-1,4,7-triazacyclononane; 1,4-bis(pyridyl-2-methyl)-7-ethyl-1,4,7-triazacyclononane; 1,4-bis(pyridyl-2-methyl)-7-methyl-1,4,7-triazacyclononane; 1,4-bis(pyrazol-1-ylmethyl)-7-octyl-1,4,7-triazacyclononane; 1,4-bis(pyrazol-1-ylmethyl)-7-ethyl-1,4,7-triazacyclononane; 1,4-bis(pyrazol-1-ylmethyl)-7-methyl-1,4,7-triazacyclononane, 3,5-dimethylpyrazol-1-ylmethyl)-7-octyl-1,4,7-triazacyclononane; 3,5-dimethylpyrazol-1-ylmethyl)-7-ethyl-1,4,7-triazacyclononane; 3,5-dimethylpyrazol-1-ylmethyl)-7-methyl-1,4,7-triazacyclononane; 1,4-bis(1-methylimidazol-2-ylmethyl)-7-octyl-1,4,7-triazacyclononane; 1,4-bis(1-methylimidazol-2-ylmethyl)-7-ethyl-1,4,7-triazacyclononane; 1,4-bis(1-methylimidazol-2-ylmethyl)-7-methyl-1,4,7-triazacyclononane, 1,4,7-tris(quinolin-2-ylmethyl)-1,4,7-triazacyclononane; 1,4,7-tris(pyridin-2-ylmethyl)-1,4,7-triazacyclononane, 1,4,7-Trimethyl-1,4,7-triazacyclononane (Me$_3$-TACN), 1,2-bis-(4,7-dimethyl-1,4,7-triazacyclonon-1-yl)-ethane (Me$_4$-DTNE).

8. The liquid curable medium composition as claimed in claim 1, wherein an iron ion of the iron complex is selected from Fe(II) and Fe(III) and a manganese ion of the manganese complex is selected from Mn(II), Mn(III), and Mn(IV).

9. The liquid curable medium composition as claimed in claim 1, wherein the primary accelerator is selected from: an iron(II) complex of dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1); and, an iron(II) complex of dimethyl 2,4-di-(2-pyridyl)-3-methyl-7-(N,N-dimethyl-amino-ethyl)-3,7-diaza-bicyclo[3.3.1]nonan-9-one-1,5-dicarboxylate (N2Py2EtNMe2).

10. The liquid curable medium composition as claimed in claim 1, wherein the primary accelerator is present at a level from 0.00001 to 0.01% w/w based on metal.

11. The liquid curable medium composition as claimed in claim 1, wherein the level of peroxide is from 0.01 to 5 wt %.

12. The liquid curable medium composition as claimed in claim 11, wherein the level of peroxide is from 0.05 to 3 wt %.

13. The liquid curable medium as claimed in claim 1, wherein the peroxide is selected from the group consisting of alkylhydroperoxides, ketone peroxides, peroxyesters, diacylperoxides, peroxyketals, dialkyl peroxides, alkylperesters, and percarbonates.

14. The liquid curable medium as claimed in claim 13, wherein the peroxide is selected from the group consisting of methyl ethyl ketone peroxide (MEKP), cumene hydroperoxide, and benzoyl peroxide.

15. The liquid curable medium as claimed in claim 1, wherein the unsaturated resin is selected from the group consisting of unsaturated polyester resin, vinyl ester resin, or acrylic resin.

16. The liquid curable medium as claimed in claim 15, wherein the resin comprises a reactive solvent selected from the group consisting of styrene, vinyl toluene, divinyl benzene, methyl methacrylate, diallyl phthalate, a-methyl styrene, triallyl cyanurate, (meth)acrylates, N-vinylpyrrolidone, and N-vinylcaprolactam.

17. The liquid curable medium as claimed in claim 1, wherein the liquid curable medium is formed by the admixture of component (iii) a primary accelerator, component (i) an unsaturated moiety, and component (ii) a peroxide.

18. The liquid curable medium as claimed in claim 1, wherein the medium contains a metal compound as a co-accelerator, wherein the metal compound includes a metal selected from the group consisting of cobalt, manganese, copper, iron, zinc, vanadium, nickel, tin, magnesium, titanium, potassium, and lithium, and wherein the compound of the metal compound is selected from the group consisting of alkyl carboxlates, acetylacetonates, and dicyclopentadiene.

19. The liquid curable medium as claimed in claim 18, wherein the co-accelerator contains cobalt and is present in liquid curable medium at a level of 0.00001 and 0.02 wt % based on metal.

20. The liquid curable medium as claimed in claim 19, wherein the co-accelerator contains cobalt and is present in liquid curable medium at a level of 0.0001 and 0.01 wt % based on metal.

21. The liquid curable medium as claimed in claim 20, wherein the cobalt salt is cobalt(2-ethylhexanoate).

22. A cured resin obtainable by curing a liquid curable medium as defined in claim 1.

23. The liquid curable medium as claimed in claim 1, wherein
the inert organic polar solvent is selected from the group consisting of propylene glycol, ethylene glycol, propylene glycol, ethanol, isopropyl alcohol and acetonitrile and further wherein the reactive organic polar solvent is selected from the group consisting of styrene, vinyl toluene, divinyl benzene, methyl methacrylate, diallyl phthalate, a-methyl styrene, triallyl cyanurate, (meth) acrylates, N-vinylpyrrolidone, N-vinylcaprolactam, acrylic monomers, oligomeric acrylates, and acrylic monomers copolymerized with styrene, vinyl toluene, divinyl benzene, acrylonitrile, vinyl acetate, and vinyl esters of carboxylic acids.

\* \* \* \* \*